United States Patent
Ghosh (10) Patent No.: US 8,268,266 B2
(45) Date of Patent: Sep. 18, 2012

(54) SYSTEM FOR HEAT INTEGRATION WITHIN A GAS PROCESSING SECTION

(75) Inventor: Romit Ghosh, Bangalore (IN)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 12/854,098

(22) Filed: Aug. 10, 2010

(65) Prior Publication Data

US 2012/0039776 A1    Feb. 16, 2012

(51) Int. Cl.
*B01J 8/00* (2006.01)
*B01J 8/04* (2006.01)
*B01J 19/00* (2006.01)
*C01B 6/24* (2006.01)

(52) U.S. Cl. ........ 422/600; 422/129; 422/187; 422/608; 422/609; 422/625; 422/626; 422/630; 422/649; 422/198; 423/650

(58) Field of Classification Search .......... 422/129, 422/187, 600, 608, 609, 625, 626, 630, 649, 422/168–170, 198; 423/650
See application file for complete search history.

(56) References Cited

U.S. PATENT DOCUMENTS

| | | | |
|---|---|---|---|
| 2008/0141647 A1 | 6/2008 | Yoshida | |
| 2009/0246118 A1* | 10/2009 | Drnevich et al. | 423/650 |
| 2010/0011664 A1* | 1/2010 | Ariyapadi et al. | 48/128 |
| 2010/0015486 A1* | 1/2010 | Yoshiba | 429/26 |
| 2010/0031572 A1* | 2/2010 | Ansorge et al. | 48/210 |
| 2010/0104901 A1* | 4/2010 | Watanabe et al. | 429/19 |
| 2011/0108405 A1* | 5/2011 | Bommareddy et al. | 202/203 |

FOREIGN PATENT DOCUMENTS

JP  2001085039  3/2001
WO  WO 2008/146632 A1 * 12/2008

* cited by examiner

*Primary Examiner* — Walter D Griffin
*Assistant Examiner* — Natasha Young
(74) *Attorney, Agent, or Firm* — Fletcher Yoder, P.C.

(57) ABSTRACT

The present embodiments are directed towards heat integration in gas processing units. In one embodiment, a system is provided that includes a gas processing section. The gas processing section has a gas path, a first shift reactor disposed along the gas path, wherein the first shift reactor is configured to perform a first shift reaction to produce a first shifted gas. A second shift reactor is also disposed along the gas path downstream from the first shift reactor, wherein the second shift reactor is configured to perform a second shift reaction to produce a second shifted gas. A first steam generator is disposed along the gas path between the first and second shift reactors, wherein the first steam generator is configured to transfer heat away from the gas path to generate a first steam.

18 Claims, 3 Drawing Sheets

SYSTEM FOR HEAT INTEGRATION WITHIN A GAS PROCESSING SECTION

BACKGROUND OF THE INVENTION

The subject matter disclosed herein relates to heat integration between exothermic reactions and gas treatment processes within a gas processing section.

In general, integrated gasification combined cycle (IGCC) plants and substitute natural gas (SNG) plants are capable of generating energy from various carbonaceous feedstocks, such as coal, relatively cleanly and efficiently. In each plant, a gasification system may convert the carbonaceous feedstock into a gas mixture of carbon monoxide (CO) and hydrogen ($H_2$), i.e., syngas, by reaction with oxygen and steam. These gases may be treated, processed, and utilized as fuel in a gas turbine, a furnace, or another application. Unfortunately, each plant may generate considerable waste energy, while also demanding considerable energy in various subsystems such as gas treatment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided that includes a gas processing section. The gas processing section has a gas path, a first shift reactor disposed along the gas path, wherein the first shift reactor is configured to perform a first shift reaction to produce a first shifted gas. A second shift reactor is also disposed along the gas path downstream from the first shift reactor, wherein the second shift reactor is configured to perform a second shift reaction to produce a second shifted gas. A first steam generator is disposed along the gas path between the first and second shift reactors, wherein the first steam generator is configured to transfer heat away from the gas path to generate a first steam.

In a second embodiment, a system includes a gas processing section. The gas processing section includes a gas path, a first shift reactor disposed along the gas path, an acid gas removal (AGR) system disposed along the gas path, and a first steam generator disposed along the gas path. The first steam generator is configured to transfer heat away from the gas path to generate a first steam. The gas processing section further includes an ammonia stripper configured to receive the first steam and a condensate from the gas path, wherein the ammonia stripper is configured to strip ammonia from the condensate using the first steam.

In a third embodiment, a system includes a gas processing section. The gas processing section includes a gas path, a first shift reactor disposed along the gas path, a first gas cooling section disposed along the gas path upstream from the first shift reactor, a second gas cooling section disposed along the gas path downstream from the first shift reactor, and a first steam generator disposed along the gas path in the first gas cooling section or the second gas cooling section, wherein the first steam generator is configured to transfer heat away from the gas path to generate a first steam, and the first steam generator is configured to supply the first steam to an ammonia stripper or a saturator in the gas processing section.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed towards enhanced steam and/or heat recovery within substitute natural gas (SNG) production and/or integrated gasification combined cycle (IGCC) power generation systems. Embodiments of the present disclosure are generally directed towards producing steam utilizing the exothermic nature of the reactions that are performed within shift reactors. As a general example, syngas produced within a dry feed gasifier may undergo sweet shift reactions, where the amounts of CO and carbon dioxide ($CO_2$) present within the syngas are adjusted after removal of acid gases. In a general sense, a shift reactor reacts CO with water vapor to generate $CO_2$, $H_2$, and heat. The shift reactor may be a vessel having a gas inlet and a gas outlet, where the gas is allowed to contact an appropriate shift catalyst. As such, the reactor may contain a catalyst capable of performing the shift reaction, such as an iron oxide catalyst, or any other transition metal or transition metal oxide catalysts. In some configurations, Raney copper may be utilized. In some arrangements, such gas acid gas removal and gas ratio adjustment occurs within a gas processing unit or section having an acid gas removal (AGR) unit and one or more sweet shift reactors, among others. According to present embodiments, the heat produced by the exothermic sweet shift reactions may be utilized to produce steam, which is able to be utilized as a heat transfer medium, as a source of power, and as a source of moisture, as described in further detail below.

Technical effects of the present embodiments include an overall reduction in the amount of steam utilized within a gasification system, such as an IGCC system. For example, in configurations utilizing a sweet shift reactor system, a more than two-fold reduction in steam requirement may be realized. Additionally, by performing treatment or sweetening (i.e., acid gas removal) prior to shift reaction, the resultant shifted syngas may contain fewer undesirable materials, such as oxidized acid gases. It should be noted that catalysts for performing sweet shift reactions may be suitable for use at higher temperatures compared to sour shift catalysts. Hence, irreversible heat losses, such as heat losses resulting from cooling the syngas in preparation for shift reaction, may be reduced. Moreover, any steam that is not utilized within the gas processing section may be exported, for example for another system process or for use in a steam turbine engine for the generation of power.

Figure 1:
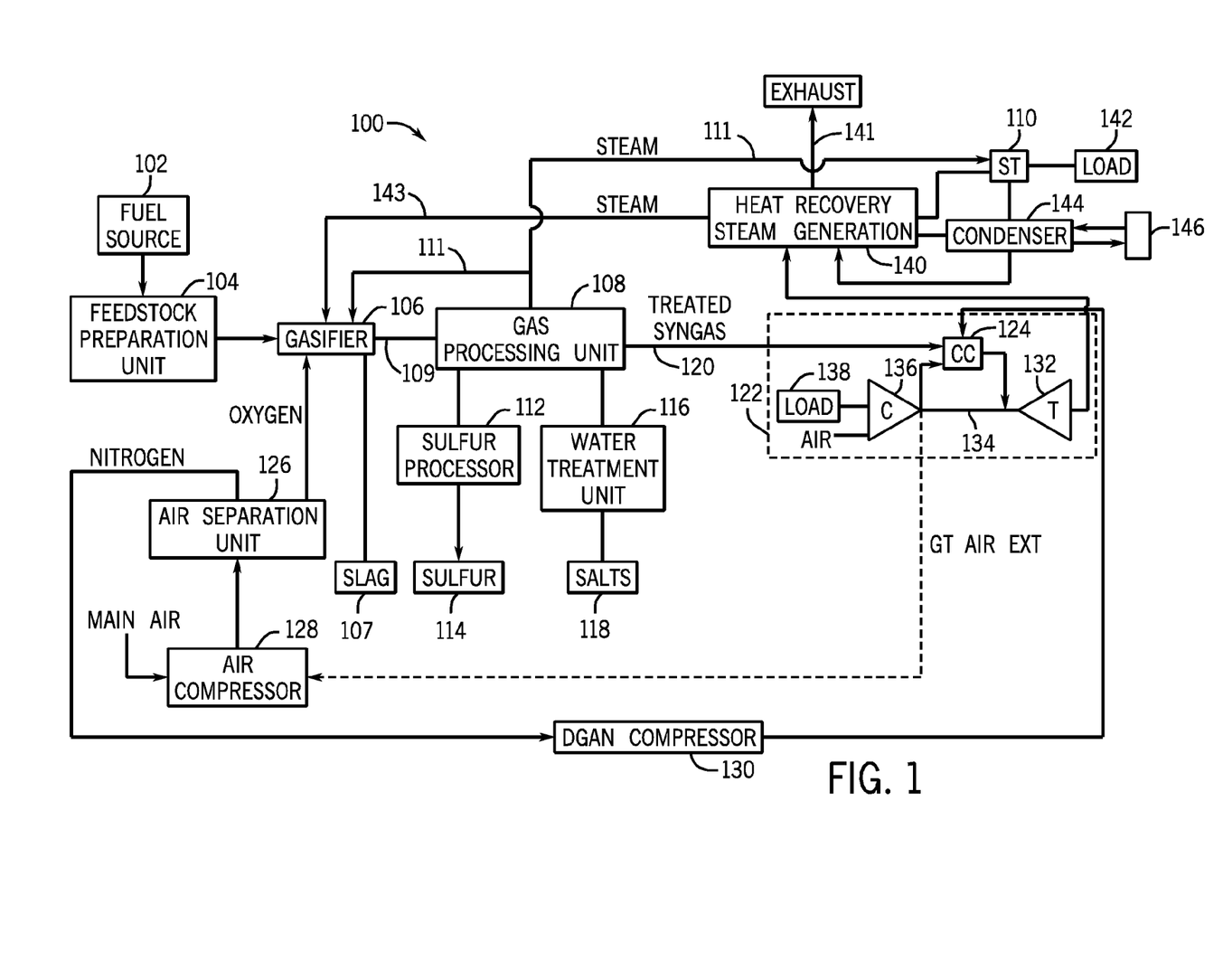
FIG. 1 is a block flow diagram of an IGCC system having a gas processing unit, wherein the gas processing unit includes heat integration for the production of steam and the reduction of energy consumption, in accordance with present embodiments.

While the present embodiments are applicable to syngas production systems having any number of configurations, the approaches described herein will be presented in the context of an integrated gasification combined cycle (IGCC) system. FIG. 1 depicts an embodiment of one such system 100, which includes, among other features, a fuel source 102, such as a solid feed that may be utilized as a source of energy for the IGCC. The fuel source 102 may include a high-rank or low-rank coal (e.g., low sulfur content coal), petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, in some configurations, water or other suitable liquids may be added to the fuel source 102 in the feedstock preparation unit 104 to create slurry feedstock. In the present embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of CO and $H_2$. This conversion may be accomplished by subjecting the feedstock to a controlled amount of steam and oxygen at elevated pressures, e.g., from approximately 20 bar to 85 bar, and temperatures, e.g., approximately 700° C.-1600° C., depending on the type of gasifier 106 utilized. The gasification process may include the feedstock undergoing a pyrolysis process. Temperatures inside the gasifier 106 may range from approximately 150° C. to 700° C. during the pyrolysis process, depending on the fuel source 102 utilized to generate the feedstock. The heating of the feedstock during the pyrolysis process may generate a solid, (e.g., char), and residue gases, (e.g., CO, $H_2$, and nitrogen ($N_2$)). The char remaining from the feedstock from the pyrolysis process may weigh up to approximately 30% of the weight of the original feedstock.

A combustion process may then occur in the gasifier 106. The combustion may include introducing oxygen to the char and residue gases. The char and residue gases may react with the oxygen to form $CO_2$ and CO, which provides heat for subsequent gasification reactions. The temperatures during the combustion process may range from approximately 700° C. to 1600° C. Next, steam may be introduced into the gasifier 106 during a gasification step. According to present embodiments, the steam provided to the gasifier 106 may be produced within the system, as described below. The char may react with the $CO_2$ and steam to produce CO and $H_2$ at temperatures ranging from approximately 800° C. to 1100° C. In essence, the gasifier utilizes steam and oxygen to allow some of the feedstock to be "burned" to produce CO and energy, which drives a second reaction that converts further feedstock to $H_2$ and additional $CO_2$.

In this way, a gas mixture is produced in the gasifier 106. This gas mixture may include up to approximately 90% of carbon monoxide and hydrogen, as well as $CH_4$, $H_2O$, Ar, $N_2$, COS, $NH_3$, and hydrogen sulfide ($H_2S$) (based on the sulfur content of the feedstock). The gas mixture may be considered untreated, raw, or sour syngas and may include up to approximately 1 mole percent $H_2S$. The gasifier 106 may also generate slag 107, which may be a wet ash material. The slag 107 may be removed from the gasifier 106 and utilized as road base or as another building material. The gas mixture is then passed to a gas processing unit 108 via path 109. Within the gas processing unit 108, some of the non-syngas components mentioned above are removed, and the composition of the syngas (i.e., the relative percentages of CO, $CO_2$ and $H_2$) are adjusted.

In general, the gas processing unit 108 may receive the untreated syngas and remove a number of gases, including COS and $H_2S$ from the untreated syngas to produce a treated or "sweetened" syngas, and may perform one or more shift reactions to adjust the composition of the syngas, as noted above. The gas processing unit 108 may utilize a solvent or combination of solvents (e.g., a combination of two or more solvents) to perform processes such as $H_2S$ and $CO_2$ removal/capture. In present embodiments, a substantial portion of the $H_2S$ is removed from the syngas, followed by shift reactions being performed on the treated or sweetened syngas (i.e., a sweet shift reaction). The shift reactions are exothermic, which allows steam to be produced for use as a moisture source, a heat source, and/or as a source of power. As an example, the present embodiments may allow the production of steam 111 at different relative pressures, which may be referred to as a high pressure steam, medium pressure steam, and a low pressure steam. The steam 111 may be sent back to the gasifier 106, for example for the gasification reaction, or may be sent to a steam turbine engine 110. Such configurations and operations of the gas processing unit 108 are described in further detail below with respect to FIGS. 2 and 3. After shift reactions and steam production, $CO_2$ removal and capture may be performed within the gas processing unit 108. The removed gases, i.e., the $CO_2$ and the $H_2S$ may be transmitted to other parts of the system 100. For example, the gas processing unit 108 may transmit the removed $H_2S$ and other sulfur-containing gases to a sulfur processor 112, such as a Claus reactor. The sulfur gases may be processed by the sulfur processor 112 to generate sulfur 114 for export. Additionally, a water treatment unit 116 that utilizes water purification techniques may generate usable salts 118 from the untreated or treated syngas.

A stream of treated syngas 120 exiting the gas processing unit 108 may be of sufficient purity for use as fuel. This treated syngas 120 may be transmitted to a gas turbine engine 122 (e.g., one or more combustors 124) as combustible fuel, as discussed below. The IGCC system 100 may further include an air separation unit (ASU) 126. The ASU 126 may operate to separate air into component gases by, for example, distillation techniques. The ASU 126 may separate oxygen from air supplied by a supplemental air compressor 128. The ASU 126 may then transfer the separated oxygen to the gasifier 106. Additionally, the ASU 126 may transmit separated nitrogen to a diluent nitrogen (DGAN) compressor 130.

The DGAN compressor 130 may compress the nitrogen received from the ASU 126 at least to pressure levels equal to those in the combustor 124, so as not to interfere with the proper combustion of the syngas. Thus, once the DGAN compressor 130 has adequately compressed the nitrogen to a proper level, the DGAN compressor 130 may transmit the compressed nitrogen to the combustor 124 of the gas turbine engine 122.

In addition to the combustor 124, the gas turbine engine 122 may also include a turbine 132, a drive shaft 134 and a compressor 136. As noted above, the combustor 124 may receive the stream of treated syngas 120, which may be injected under pressure from fuel nozzles. The syngas 120 may be mixed with compressed air as well as compressed nitrogen from the DGAN compressor 130, and combusted within combustor 124. This combustion may create hot pressurized exhaust gases. The combustor 124 may direct the exhaust gases into the turbine 132, thereby forcing turbine blades in the turbine 132 to rotate the drive shaft 134 along an axis of the gas turbine engine 122. As illustrated, the drive shaft 134 is connected to various components of the gas turbine engine 122, including the compressor 136.

Rotation of turbine blades in the turbine 132 may cause the drive shaft 134 connecting the turbine 132 to the compressor 136 to rotate blades within the compressor 136. This rotation of blades in the compressor 136 causes the compressor 136 to compress air received via an air intake in the compressor 136. The compressed air may then be fed to the combustor 124 and mixed with the syngas 120 and compressed nitrogen to allow for higher efficiency combustion. Drive shaft 134 may also be connected to load 138, which may be a stationary load, such as an electrical generator for producing electrical power, for example, in a power plant. Indeed, load 138 may be any suitable device that is powered by the rotational output of the gas turbine engine 122. After the hot pressurized exhaust gases pass through the turbine 132, the resultant gas is then sent to a heat recovery steam generation (HRSG) system 140.

The HRSG system 140 is generally configured to cool and catalytically treat the exhaust gases. The HRSG system 140 may also have an exhaust stack or similar feature to release exhaust 141. In cooling the exhaust gases, the HRSG system 140 produces steam 143. The steam, along with the steam produced within the gas processing unit 108, may be delivered to the steam turbine engine 110 or back to the gasifier 106. The steam turbine engine 110 may, for example, drive a second load 142 for power generation. Accordingly, in a similar manner to the load 138, the second load 142 may be an electrical generator for generating electrical power. However, both the first and second loads 138, 142 may be other types of loads capable of being driven by the gas turbine engine 122 and steam turbine engine 110. In addition, although the gas turbine engine 122 and steam turbine engine 110 may drive separate loads 138 and 142, as shown in the illustrated embodiment, the gas turbine engine 122 and steam turbine engine 110 may also be utilized in tandem to drive a single load via a single shaft. The specific configuration of the steam turbine engine 110, as well as the gas turbine engine 122, may be implementation-specific and may include any combination of features relating to gas combustion and compression.

Exhaust from, for example, a low-pressure section of the steam turbine engine 110 may be directed into a condenser 144. The condenser 144 may utilize a cooling tower 146 to exchange heated water for chilled water. The cooling tower 146 acts to provide cool water to the condenser 144 to aid in condensing the steam transmitted to the condenser 144 from the steam turbine engine 110. Condensate from the condenser 144 may, in turn, be directed into the HRSG 140. Again, exhaust from the gas turbine engine 122 may also be directed into the HRSG 140 to heat the water from the condenser 144 and produce steam. The cycle associated with the gas turbine engine 122 is often referred to as the "topping cycle," whereas the cycle associated with the steam turbine engine 110 is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
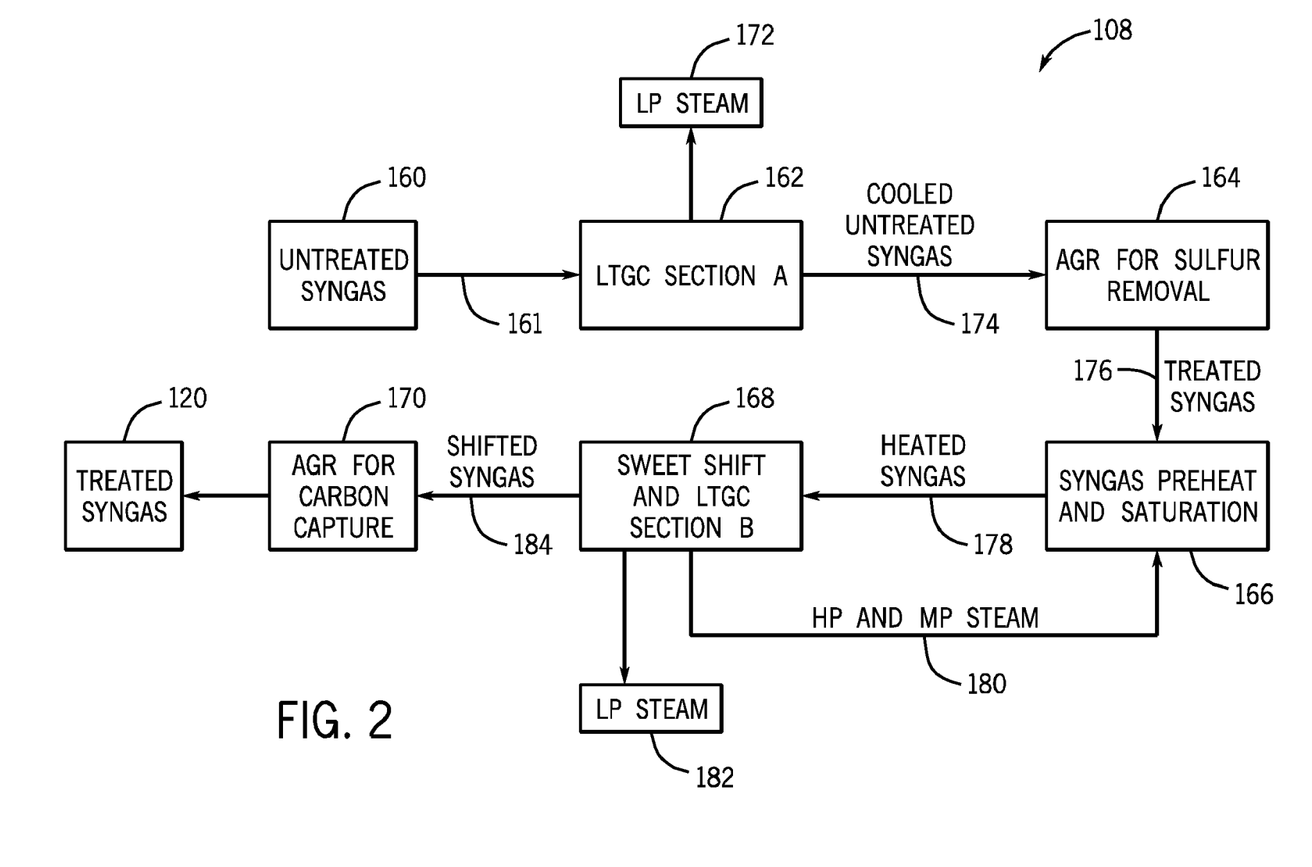
FIG. 2 is a block flow diagram of the gas processing unit of FIG. 1 having heat integration features for the production of steam and reduction of required energy input, in accordance with present embodiments.

As noted above, the present embodiments are directed to heat integration and steam production within the gas processing unit 108, such that processes that utilize steam, such as those described above with respect to the steam turbine engine 110, may be at least partially driven by the steam so generated. Such an embodiment is illustrated in FIG. 2, which is a high-level block flow diagram of features contained within and/or connected to the gas processing unit (GPU) 108 of FIG. 1. The GPU 108, as noted above, generally receives a stream of untreated syngas 160. The stream of untreated syngas 160 travels along a gas path 161, through which the various steam-producing and syngas-treating features are connected. In a general sense, the gas path 161 connects a first low temperature gas cooling (LTGC) section 162, a first acid gas removal (AGR) section for sulfur removal 164, a syngas preheat and saturation section 166, a sweet shift and second LTGC section 168, and a second AGR section for carbon capture 170. It should be noted that these sections may by connected by other conduits in addition to the gas path 161, such as by liquid conduits, heat exchangers, and so forth, and that the gas path 161 may only illustrate the general direction of flow of syngas (and other process gases) through the GPU 108.

During operation, the stream of untreated syngas 160 enters into the GPU 108 via the gas path 161. The LTGC section 162 generally exchanges heat between the stream of untreated syngas 160 and a source of water. In this way, the stream of untreated syngas 160 is then cooled in the first LTGC section 162, which generates steam 172, which may have a relatively lower pressure compared to other steam produced within the GPU 108. The stream of untreated syngas 160 may be cooled by at least 200%, or approximately 200, 250, 300, 350, 400, or 450%. As an example, the stream 160 may be cooled from between approximately 150 and 200° C. (e.g., approximately 170, 175, or 180° C.) to between approximately 0 and 50° C. (e.g., approximately 0, 20, or 40° C.). The first LTGC section 162 transmits a stream of cooled untreated syngas 174 along the gas path 161 to the first AGR section 164.

In the first AGR section 164, the stream of cooled untreated syngas 174 may flow through one or more treatment columns where the cooled untreated syngas 174 is mixed, for example via countercurrent, with one or more solvents capable of removing a substantial portion of sulfur-containing gases from the stream of untreated syngas 174. One example of such a solvent is a mixture of dimethyl ethers of polyethylene glycol (DEPG). Such processes may be referred to in the art as "treating," or "sweetening," with the resultant product syngas being referred to as "treated," or "sweet." After such treatment, the treated syngas may have less than approximately 1 part per million by volume (ppmv) of sulfur gases, for example less than approximately 1, 0.5. 0.2, or 0.1 ppmv $H_2S$. It should be noted that the solvent (e.g., DEPG) may also remove a portion of the $CO_2$ within the syngas. For example, between approximately 20 and 40% (e.g., approximately 20, 25, 30, 35, or 40%) of the $CO_2$ may be removed. Nevertheless, a stream of treated syngas 176 is then transmitted along the gas path 161 to the syngas preheat and saturation section 166.

As the treated syngas 176 flows through the gas path 161 and into the syngas preheat and saturation section 166, the treated syngas 176 may encounter one or more heat exchangers configured to transfer heat between process gases (i.e., between the treated syngas 176 and subsequently processed, heated streams of syngas), one or more heat exchangers configured to transfer heat from steam to the treated syngas 176, areas configured to mix the treated syngas 176 with steam, or any combination thereof. One embodiment of such a configuration of the syngas preheat and saturation section 166 is described in further detail below with respect to FIG. 3.

Continuing with FIG. 2, in the syngas preheat and saturation section 166, the treated syngas 176 undergoes heating, with moisture being added for subsequent shift reactions. The treated syngas 176 may be heated by at least approximately 400%, for example, by approximately 400%, 500%, 750%, 800%, 900%, or 1000%. In one embodiment, the syngas may be heated from between approximately 0 and 50° C. (e.g. approximately 0, 10, 20, 30, 40, or 50° C.) to between approximately 100 and 400° C. (e.g. approximately 150, 200, 300, or 400° C.). The moisture added to the treated syngas may be high pressure steam, medium pressure steam, low pressure steam, or any combination thereof. It should be noted that reference to low pressure, medium pressure, and high pressure steam is merely to facilitate discussion, and is not intended to limit the scope of the present embodiments. Indeed, the embodiments presently discussed may be configured to produce medium and/or high pressure steam in addition to or in lieu of low pressure steam, low and/or medium pressure in addition to or in lieu of high pressure steam, and so on. Further, it should be noted that the terms low, medium, and high with reference to pressure are relative terms. As an example, low pressure may be between approximately 1 and 6 bar (e.g., approximately 1, 2, 3, 4, 5, or 6 bar), medium pressure may be between approximately 7 and 20 bar (e.g., approximately 7, 8, 9, 10, 15, or 20 bar), and high pressure may be at least 20 bar or greater (e.g., approximately 20, 30, 40, 50, 55, 60 bar or more).

The steam is added to the treated syngas 176, for example via injection into the gas path 161, by mixing in a vessel, or any similar technique. The steam may be added to the treated syngas in an amount suitable to adjust the ratio of steam-to-dry gas to a level appropriate for subsequent shift reactions. The appropriate ratio of moisture (e.g., steam) for the shift reactions may depend on the composition of the coal, the desired ratio of CO to $CO_2$, the shift catalyst, and so forth. In some embodiments, a suitable ratio of steam-to-dry gas may be between approximately 0.4 and 0.8 (e.g., approximately 0.4, 0.5, 0.6, 0.7, or 0.8), based on the weight of the gases.

After heating and steam addition, a resultant stream of heated syngas 178 is then transmitted along the gas path 161 to the sweet shift and second LTGC section 168. Within the sweet shift and second LTGC section 168, the stream of heated syngas 178 undergoes a series of shift reactions and heat exchanges to produce high pressure (HP) and medium pressure (MP) steam 180, low pressure (LP) steam 182, and a stream of shifted syngas 184. Within the sweet shift and second LTGC section 168, the ratio of CO to $CO_2$ is adjusted in one or more shift reactions, which are exothermic. The resultant hot shifted syngas is then utilized to produce steam via one or more heat exchangers. Further, it should be noted that in embodiments utilizing more than one shift reactor (i.e., more than one shift reaction is performed), one or more heat exchangers may be present between each shift reactor. In this way, steam may be produced between each shift reaction, or after a plurality of shift reactions, or a combination thereof. Specifically, one or more heat exchangers remove heat from the gas path 161 to produce the HP and MP steam 180, which is provided to the syngas preheat and saturation section 166 as a source of heat and moisture. Hence, the sweet shift and second LTGC section 168 may be heat integrated with the syngas preheat and saturation section 166 at least by the HP and MP steam 180 that is provided back to the syngas preheat and saturation section 166 and produced after the one or more shift reactions. The LP steam 182 that is also produced after any one of the shift reactions may have a number of uses, for example as a heat exchange fluid, as a gas treatment fluid, and so on. In present embodiments, the LP steam 182 may be used for ammonia removal, as described below.

After the shift reactions are performed, heat is transferred away from the gas path 161, such that the shifted syngas is cooled. Such cooling may be performed to allow the shifted syngas to be further treated with one or a combination of solvents that are capable of removing at least a substantial portion of the $CO_2$ from the shifted syngas 184. As such, the shifted syngas 184 is transmitted along the gas path 161 and to the second AGR section 170, which is configured for carbon capture. Within the second AGR section 170, the shifted syngas 184 is mixed, for example in one or more vessels via countercurrent, with the one or more solvents capable of removing a substantial portion of the $CO_2$ within the shifted syngas 184. For example, the one or more solvents may include an alcohol or mixture of alcohols such as methanol, ethanol, and so on, or any solvent that may have a higher affinity for $CO_2$ than other process gases. As noted above with respect to FIG. 1, after carbon capture is performed at the second AGR section 170 the stream of treated syngas 120 is provided to other processes within the plant, such as combustion within the gas turbine engine 122.

Figure 3:
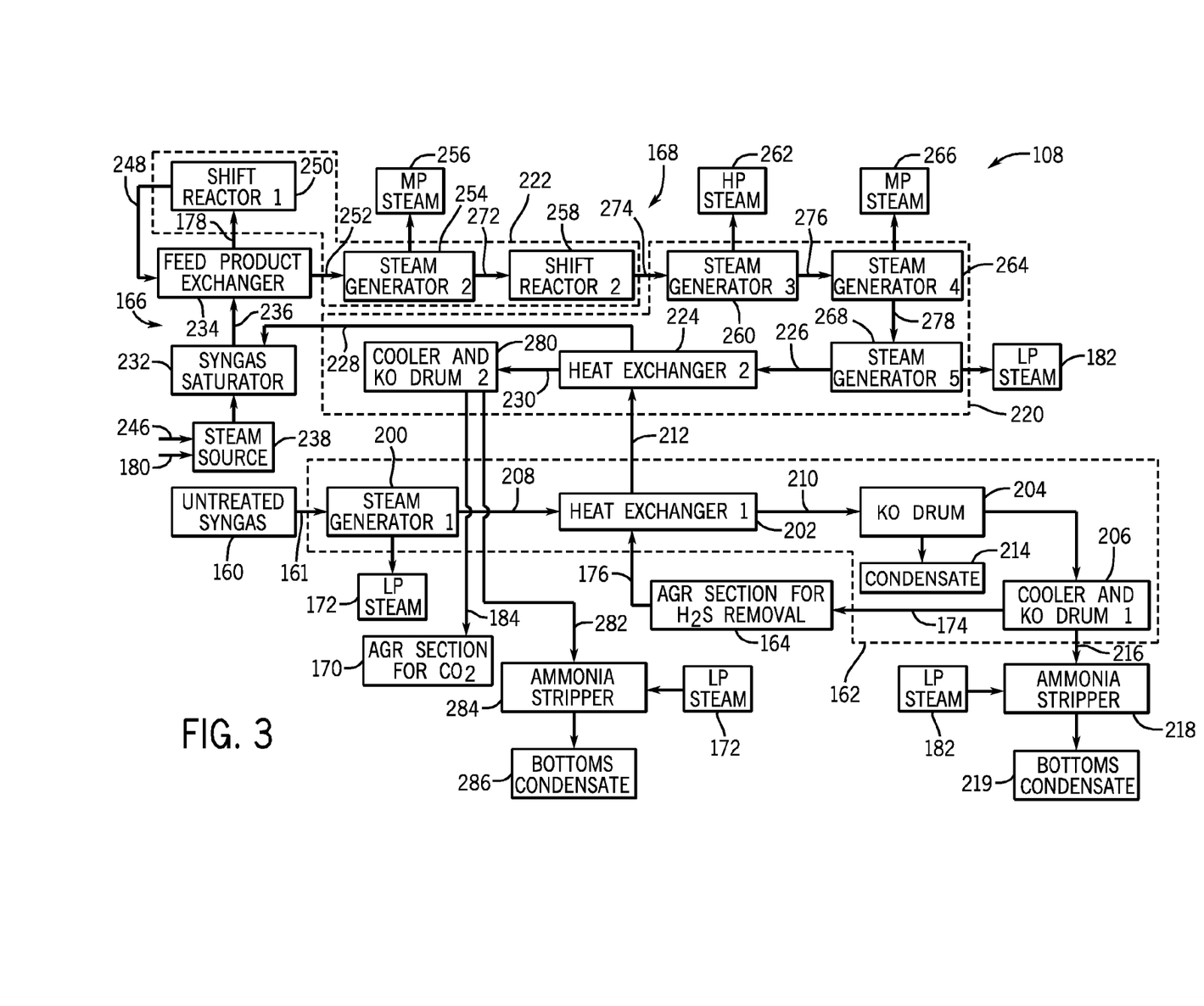
FIG. 3 is a block flow diagram illustrating the heat integration features of the gas processing unit of FIG. 2, including features for the production of steam utilizing the heat produced in one or more shift reactors, in accordance with present embodiments.

Heat integration according to the present embodiments may be further appreciated with reference to FIG. 3, which is a more detailed block flow diagram of the GPU 108. More specifically, FIG. 3 illustrates the steam-producing and heat integration schemes between each section set forth in FIG. 2. As noted above, after the gasification reaction, the untreated syngas 160 enters the first LTGC section 162 via the path 161. The first LTGC section 162 includes, sequentially along the gas path 161, a first steam generator 200, a first heat exchanger 202, a first knockout (KO) drum 204, and a first cooler and KO drum combination 206. The untreated syngas 160 first encounters the first steam generator 200, which is configured to remove heat from the gas path 161 (e.g., cool the untreated syngas 160) by exchanging heat between the untreated syngas 160 and a water source. Thus, the first steam generator 200 produces a stream of slightly cooled syngas 208 and the LP steam 172.

In one embodiment, the water source from which the steam may be generated may be a boiler feedwater or similar cooling water having a temperature of between approximately 0 and 40° C. (e.g., between approximately 10 and 35° C., 15 and 30° C., or 20 and 30° C.). Therefore, the first steam generator 200 may utilize feedwater having such a temperature to produce the LP steam 172 and the stream of slightly cooled syngas 208. The stream of slightly cooled syngas 208 may have a temperature that is cooled (compared to the untreated syngas stream 160) by between approximately 5 and 20%. For example, the stream of slightly cooled syngas 208 may have a temperature that is approximately 5, 10, 15, or 20% lower than the stream of untreated syngas 160. In one embodiment, the stream of untreated syngas 160 may be cooled from between approximately 170° C. and 180° C. to between approximately 150° C. and 160° C. Further, it should be noted that such cooling may also affect the pressure of syngas streams, such that a decrease in temperature also causes a decrease in pressure. As an example, the stream of slightly cooled syngas 208 may have a pressure that is between approximately 1 and 10% (e.g., approximately 1, 2, 3, 4, 5, 6, 7, 8, 9, or 10%) lower than the stream of untreated syngas 160. In one embodiment, the pressure may decrease from between approximately 36.8 and 37.0 bar to between approximately 36.4 and 36.7 bar.

It should be noted that the amount of steam (and syngas) that is produced in accordance with present embodiments may depend at least partially on the fuel source 102. As an example, two different types of coal may produce syngas having differing pressures and/or temperatures. In this way, a fuel source that produces a syngas having a higher temperature and pressure than would be produced using another fuel source may ultimately result in a concomitant increase in steam produced. For example, in one embodiment, one fuel source may produce approximately 5 tons/hr of steam while another produces approximately 95 tons/hr, using the same configurations, at the first steam generator 200.

The stream of slightly cooled syngas 208 is then subsequently cooled at the first heat exchanger 202, by heat exchange with the treated syngas 176 that is produced within the first AGR section 164, to produce a stream of cooled syngas 210. For example, the subsequent cooling may reduce the temperature of the slightly cooled syngas 208 by at least approximately 10% (e.g., approximately 10, 20, 30, 40, 50, or 60%). In one embodiment, the syngas 208 may be cooled to between approximately 80° C. and 120° C. Additionally, the pressure may be reduced by at least 1%, for example, at least approximately 1, 2, 3, 5, 10, 20% or more. For example, in one embodiment, the pressure may be reduced to between approximately 36.0 and 36.4 bar. Of course, by exchanging heat with the stream of slightly cooled syngas 208, the stream of treated syngas 176 is heated to produce a stream of warm treated syngas 212. The warm treated syngas 212 may have a temperature that is at least approximately 50% higher than the stream of treated syngas 176, such as approximately 50, 100, 150, 200, or 250% higher. As an example, the stream 212 may have a temperature of between approximately 100° C. and 120° C. Processes involving the warm treated syngas 212 are discussed in further detail below.

The stream of cooled syngas 210 is directed to the KO drum 204, which is generally configured to remove moisture from the stream 210. For example, the KO drum 204 may collect condensate 214 (e.g., HP condensate) from the stream 210. It should be noted that the amount of condensate so removed or collected may be at least partially dependent upon the original moisture content of the fuel source 102 (FIG. 1). For example, one type of coal may contain more moisture than another type. In a general sense, the fuel source having the higher moisture content may produce more condensate. Further, as the condensate may be HP condensate, minimal to no cooling may be required for its collection, with further cooling and collection being performed after initial HP condensate removal to allow more efficient cooling of the lower pressure components of the stream 210 (such as to allow condensation of lower pressure steam).

After the initial removal of condensate in the first KO drum 204, the stream 210 is then cooled in the first cooler and KO drum 206. The first cooler and KO drum 204 is generally configured to cool the stream 210 and remove condensate in preparation for acid gas removal in the first AGR unit 164.

Therefore, the first cooler and KO drum 206 cools the stream 210 by an amount sufficient for treatment in the first AGR unit 164, such as by at least approximately 20%. For example, the stream 210 may be cooled by at least approximately 20, 30, 40, 50, 60, or 70%, with moisture being removed in the form of syngas condensate 216 (e.g., LP syngas condensate) having a relatively higher concentration of water. In one embodiment, the stream 210 may be cooled to between 0 and 60° C. (e.g., approximately 0, 20, 40, or 60° C.). In the illustrated embodiment, the syngas condensate 216 is provided to an ammonia stripper 218, which is generally configured to remove ammonia from the syngas condensate 216 to produce a bottoms condensate 219 having an ammonia concentration of less than approximately 50 ppm by weight, such as less than 40, 30, 20, or 10 ppm by weight.

Upon leaving the first cooler and KO drum 206, the resultant stream of cooled untreated syngas 174 exits the first LTGC section 162 and enters the first AGR unit 164. As noted above, the cooled untreated syngas 174 is mixed with one or more solvents capable of removing a substantial portion of sulfur gases (e.g., COS, $H_2S$), such that the resulting treated syngas 176 contains sufficiently low levels of $H_2S$ for subsequent shift reactions. To prepare the treated syngas 176 for subsequent shift reactions, the syngas 176 may also be heated via a series of heat exchangers contained within the first LTGC section 162 and a second LTGC section 220 within the sweet shift and second LTGC section 168. Therefore, it should be noted that the syngas preheat and saturation section 166 encompasses features within the first and second LTGC sections 162, 220.

To begin such preparatory heating, the stream of treated syngas 176 passes through the heat exchanger 202 of the first LTGC section 162 where, as noted above, heat is transferred between process gases. More specifically, the stream of slightly cooled untreated syngas 208 warms the treated syngas stream 176 to produce the stream of warmed treated syngas 212. Therefore, in the illustrated embodiment, the gas path 161 is heat integrated with itself at the first heat exchanger 202, where the temperature of the treated syngas stream 176 is increased by at least approximately 10% and the slightly cooled untreated syngas stream 208 is cooled by at least approximately 10%. For example, the temperature of the treated syngas stream 176 may increase by at least approximately 10, 20, 50, 75, 100, 150, 200, or 250% or more. Such an increase in temperature may also increase the pressure of the stream of treated syngas 176, with its pressure increasing by at least approximately 1%, for example at least approximately 1, 2, 3, 4, 5, 10, 20, 50, or 100%.

After the stream of warmed treated syngas 212 exits the first heat exchanger 202, it travels along the gas path 161 and to a second heat exchanger 224 of the second LTGC section 220. The second heat exchanger 224, like the first heat exchanger 202, is an area where the gas path 161 is heat integrated with itself, and is generally configured to allow heat transfer between process gases. Specifically, a stream of syngas 226 having a relatively higher temperature resulting from shift reaction heats the stream of treated syngas 212 to produce a stream of warmed syngas 228. Such heat transfer may result in the treated syngas 228 having a temperature that is at least approximately 5% higher than the syngas 212, for example approximately 5, 10, 15, 20, 30, 50, 100, 200, or 250% higher. Further, the syngas stream 226 is concomitantly cooled, such that a stream of cooled shifted syngas 230 is produced, as discussed below. In one embodiment, the syngas stream 228 may have a temperature of between approximately 150° C. and 160° C., and the resulting stream of syngas 228 may have a temperature of between approximately 130° C. and 140° C.

After undergoing heat exchange within the second LTGC section 220, the stream of treated syngas 228 is transmitted along the gas path 161 to a syngas saturator 232 and a feed product exchanger 234 within the syngas preheat and saturation section 166. Due to the condensate generation performed in the first LTGC section 162, the stream of treated syngas 228 may not have sufficient moisture content for the one or more shift reactions that are performed in subsequent sections. For example, the steam-to-dry gas ratio of the stream of treated syngas 228 may be less than approximately 0.1, such as approximately 0.1, 0.01, 0.001, 0.002, 0.003, and so on. Accordingly, the syngas saturator 232 allows the addition of steam to the stream of treated syngas 228 in an amount suitable for shift reaction. For example, the syngas saturator 232 may be a saturation column to which the stream of treated syngas 228 may be provided, along with steam injected from a steam source 238 to produce a stream of moisturized treated syngas 236. The steam source 238 may include steam produced within the GPU 108, such as the HP and MP steam 180 produced within the sweet shift and second LTGC section 168, as mentioned above and discussed in further detail below. The steam source 238 may also include imported HP steam 246 provided from other areas of the system 100, such as from gasification processes and so forth.

The stream of moisturized treated syngas 236, due at least in part to the addition of the source of steam 238, may have a temperature that is higher than the stream of treated syngas 228, for example, between approximately 5 and 20% (e.g., approximately 5, 10, 15, or 20%) higher. In one embodiment, the stream 236 may be heated to a temperature of between approximately 150° C. and 270° C. However, due at least in part to the addition of components other than syngas, the stream of moisturized treated syngas 236 may have a lower pressure than the stream 228. For example, the stream 236 may have a pressure that is approximately 1.5, 2, 3, 4, 5, 10, or 20 times lower than the stream 228. In one embodiment, the pressure of the stream 236 may be between approximately 8 bar and 10 bar. Nevertheless, as noted above, the stream of moisturized treated syngas 236 may have a steam-to-dry gas ratio that is suitable for shift reaction, such as between approximately 0.4 and 0.8. It should be noted that the amount of steam at each pressure, as well as the entire amount of steam utilized at the syngas saturator 232 may depend on the capacity of the GPU 108, the amount of condensate removed within the first LTGC section 162, and the composition of the initial fuel source 102 (FIG. 1), among other factors. For example, in one embodiment, the syngas saturator 232 may utilize between approximately 90 and 110 tons/hr of HP steam and between approximately 70 and 80 tons/hr of MP steam. In another embodiment, the syngas saturator 232 may utilize between approximately 40 and 50 tons/hr of HP steam and between approximately 50 and 60 tons/hr of MP steam.

Upon the addition of steam for moisture and heat, the stream of moisturized syngas 236 is transmitted along the gas path 161 (which may also include a steam path) to the feed product exchanger 234, where the stream 236 is heat integrated with a first shifted product stream 248 produced within a first shift reactor 250 of the sweet shift and second LTGC section 168. Such heat integration produces the heated stream of treated syngas 178. That is, the gas path 161 is heat integrated with itself at the feed product exchanger 234. As an example, the heated syngas stream 178 is at a temperature that is approximately 10, 20, 50, 60, 100, 150, 200 or 300% greater than the temperature of the stream 236 entering the feed product exchanger 234. In one embodiment, the temperature of the stream 178 may be between approximately 300° C. and 370° C.

To increase the level of carbon capture in the system 100, after the stream 178 is suitably prepared for shift reaction, it is transmitted along the gas path 161 to the first shift reactor 250. Within the first shift reactor 250, the ratio of $CO_2$ to CO within the syngas stream 178 is adjusted by reacting CO with $H_2O$ to produce $CO_2$, the process of which is exothermic. As an example, between approximately 30 and 40% (e.g., approximately 30, 35, or 40%) of the CO is converted to $CO_2$. Due to the exothermic nature of the shift reaction, the first shifted product stream 248 may have a temperature at the outlet of the first shift reactor 250 that is at least approximately 20% higher than the stream of heated syngas 178. For example, the first shifted product stream 248 may have a temperature that is at least approximately 20, 25, 30, 35, 40, or 45% higher than the stream 178. In some embodiments, the temperature of the first shifted product stream 248 may be between approximately 400° C. and 500° C., for example approximately 400, 420, 440, 460, 480, or 500° C.

As a result of this exothermic process, the resultant first shifted product stream 248 is transmitted along the gas path 161 and back to the feed product exchanger 234 to heat various integrated process gases, as noted above. In heat integrating such process streams, a portion of the heat contained within the first shifted product stream 248 is transferred to the stream of moisturized syngas 236 to produce the stream of hot treated syngas 178 for shift reaction. Accordingly, the feed product exchanger 234 and the first shift reactor 250 may form a heat cycle. A stream of shifted syngas 252 having a reduced temperature then exits the feed product exchanger 234 and re-enters the sweet shift and second LTGC section 168. As an example, the feed product exchanger 234 may reduce the temperature of the first shifted syngas 248 by at least approximately 20% (e.g., at least approximately 20, 25, 30, 35, 40% or more). In one embodiment, the temperature of the resultant stream of shifted syngas 252 may be between approximately 300 and 400° C. (e.g., approximately 300, 320, 340, 360, 380, or 400° C.). As noted above, the present embodiments utilize a number of steam generators within the section 168 to produce steam from the heat contained in the stream of shifted syngas 252, which may be used for power generation and within the syngas saturator 232.

More specifically, when the shifted syngas 252 re-enters the sweet shift and second LTGC section 168, it encounters a second steam generator 254 configured to produce MP steam 256, a second shift reactor 258 configured to perform a second shift reaction, a third steam generator 260 configured to produce HP steam 262, a fourth steam generator 264 configured to produce MP steam 266, and a fifth steam generator 268 configured to produce LP steam 182. The steam generators 200, 254, 258, 260, 261, and 268, in a general sense, may be heat exchangers, jacketed conduits, vessels, and so forth. The MP steam 256, 266 and the HP steam 262 may be used for power generation (for example in one or more steam turbine engines), may be combined and provided to the syngas saturator 232 as the stream of HP and MP steam 180, or a combination of both. As discussed in further detail below, the LP steam 182 may be provided to the ammonia stripper 218 or other processes. For example, the ammonia stripper 218 may receive the LP steam 182 and the stream of condensate 216. The ammonia stripper 218 may be generally configured to remove a substantial portion of the ammonia present within the syngas condensate stream 216 by flowing a countercurrent of the LP steam 182 against the stream 216, such that the ammonia is removed by the steam 182. The resulting bottoms condensate 219 may then have less than about 10, 5, or 1 ppm ammonia.

As noted above, the shifted syngas 252 may contain sufficient heat to produce the MP steam 256 at the second steam generator 254. As an example, in one embodiment, the amount and heat of the shifted syngas 252 may be sufficient to produce between approximately 30 and 40 tons/hr of MP steam. The MP steam 256 is produced by transferring heat away from the gas path 161 and to a source of water, such as a boiler feedwater. Accordingly, a stream of shifted syngas 272 having a lowered temperature compared to the shifted syngas stream 252 may exit the second steam generator 254. For example, the stream of shifted syngas 272 may have a temperature that is at least approximately 20, 30, 40, 50, 60, 70, or 75% lower than the stream 252. In one embodiment, the temperature of the shifted syngas 272 may be between approximately 200° C. and 220° C. (e.g., approximately 200, 210, or 220° C.). In a general sense, the shifted syngas 272 may be at a temperature and pressure that is appropriate for the shift reaction that is performed within the second shift reactor 258. Thus, in addition to a temperature reduction, the cooling of the stream of shifted syngas 252 may result in a pressure reduction as well. The pressure of the stream of shifted syngas 252 may be reduced at the second steam generator 254 by between approximately 5 and 20%, such as by approximately 5, 10, 15, or 20%. In one embodiment, the pressure may be reduced from between approximately 6.7 bar and 7.0 bar to between approximately 6.4 bar and 6.6 bar.

The stream of shifted syngas 272, having an appropriate temperature and pressure, is then provided to an inlet of the second shift reactor 258. Within the second shift reactor 258, a second portion of the CO is converted to $CO_2$, such that the total amount of CO converted to $CO_2$ (including the conversion within the first reactor) is between approximately 50 and 80% (e.g., approximately 50, 60, 65, 70, or 80%). In a similar manner to the first shift reactor 250, the second shift reactor 258 produces a heated stream of shifted syngas as a result of the exothermic shift process. Specifically, a second shifted product syngas 274 exits the second shift reactor 258, with its temperature being at least approximately 50% higher than the temperature of the stream of shifted syngas 272. For example, the temperature of the second shifted product syngas 274 may be approximately 50, 60, 70, 80, 85, 90, or 100% higher. In some embodiments, the temperature of the second shifted product syngas 274 may be between approximately 330° C. and 400° C. (e.g., approximately 330, 340, 350, 360, 370, 380, 390, or 400° C.). However, despite such an increase in temperature, the pressure of the second shifted syngas product 274 is lower than the stream 272, for example by between approximately 10 and 20%.

As noted above, the present embodiments utilize heat integration features to produce steam at a variety of pressures and for a number of uses. In the illustrated embodiment, the second shifted product syngas 274 encounters the third steam generator 260, the fourth steam generator 264, and the fifth steam generator 268 in series, each of which produce steam that is generated by removing heat away from the gas path 161 and transferring the heat to a source of water, such as boiler feedwater. At the third steam generator, the second shifted product syngas 274 is cooled by between approximately 20 and 60%, for example approximately 20, 40, 60, or 80% and generates the HP steam 262. In one embodiment, the shifted syngas stream 276 may have a temperature between approximately 250 and 300° C. (e.g., 250, 260, 270, 275, 280, 290, or 300° C.). Upon exiting the third steam generator 260, a shifted syngas stream 276 is transmitted along the gas path 161 to the fourth steam generator 264, which is configured to remove heat away from the gas path 161 and generate the MP steam 266. As an example, the fourth steam generator 260 may be configured to reduce the temperature of the stream of shifted syngas 276 by at least approximately 20%, for example by at least approximately 20, 30, 35, 40, 50% or more to produce a stream of shifted syngas 278. In one embodiment, the stream of shifted syngas 278 may have a temperature between approximately 160 and 200° C., for example 160, 170, 180, 190, or 200° C. As noted above, the HP steam 262 and the MP steam 266 may be used in the syngas saturator 232 or other processes within the system 100, such as in the steam turbine engine 110. The LP steam 182 produced by the fifth steam generator 268 from the stream of shifted syngas 278 is illustrated as being utilized for ammonia stripping processes, as described below.

As with the other steam generators, the fifth steam generator 268 is configured to produce the stream of shifted syngas 226 having a lower temperature relative to the stream 278, for example approximately 10, 20, or 30% lower. As noted above, however, its temperature is sufficient for heat integration with the stream 212 at the heat exchanger 224, which is configured to allow cooling of the shifted syngas stream 226 and heating of the treated syngas stream 212. The heat exchanger 224 heats the stream 226 to produce the stream of shifted syngas 230, while cooling the stream 212 to produce the heated syngas stream 228. In a final step of the processes within the sweet shift and second LTGC section 168, the stream of shifted syngas 230 is transmitted along the gas path 161 to a second cooler and KO drum 280.

At the second cooler and KO drum 280, the stream of shifted syngas 230 is cooled to a temperature that is appropriate for treatment at the second AGR section 170. As an example, the stream 230 is cooled to between approximately 0 and 60° C., more specifically to approximately 0, 20, 40, or 50° C. Further, the second cooler and KO drum 280 is configured to remove a substantial portion of the water within the syngas stream 230, such that a stream of syngas condensate 282 may be provided, along with LP steam 182, to an ammonia stripper 284. As an example, by removing ammonia from the syngas condensate 282 using the LP steam 182, a resulting bottoms condensate 286 may have an ammonia concentration of less than approximately 50 ppm by weight, such as less than 40, 30, 20, or 10 ppm by weight. Substantially simultaneously to such processes, the stream of shifted syngas 184 may be provided to the second AGR section 170 for carbon capture to produce the stream of treated syngas 120 as illustrated in FIG. 1. The second AGR section 170, as mentioned, may be configured to flow one or more solvents capable of removing a substantial portion of the remaining CO2, for example for CO2 export. The solvents, again, may include low molecular weight alcohols such as methanol, ethanol, isopropanol, and so on, or may include other solvents mentioned above such as DEPG. Indeed, any solvent capable of selectively removing CO2 from the stream 184 may be utilized. In some embodiments, the CO2 so removed may be of sufficient purity for chemical use. For example, the CO2 may be about 90, 95, 98, 99% or more pure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas processing section, comprising:
   a gas path;
   a first shift reactor disposed along the gas path, wherein the first shift reactor is configured to perform a first shift reaction to produce a first shifted gas;
   a second shift reactor disposed along the gas path downstream from the first shift reactor, wherein the second shift reactor is configured to perform a second shift reaction to produce a second shifted gas;
   a first steam generator disposed along the gas path between the first and second shift reactors, wherein the first steam generator is configured to transfer heat away from the gas path to generate a first steam;
   a first gas cooling section having a first exchanger disposed along the gas path upstream from the first shift reactor;
   a second gas cooling section having a second heat exchanger disposed along the gas path downstream from the second shift reactor; and
   an acid gas removal (AGR) section disposed along the gas path between the first gas cooling section and the first shift reactor;
   wherein the gas path comprises a first portion passing through the first heat exchanger upstream from the AGR section and a second portion passing through the first heat exchanger downstream from the AGR section, and the first heat exchanger is configured to transfer heat from the first portion to the second portion;
   wherein the gas path comprises a third portion passing through the second heat exchanger downstream from the second shift reactor and the second portion passing through the second heat exchanger downstream from the first heat exchanger, and the second heat exchanger is configured to transfer heat from the third portion to the second portion.

2. The system of claim 1, comprising a second steam generator disposed along the gas path downstream from the second shift reactor, wherein the second steam generator is configured to transfer heat away from the gas path to generate a second steam.

3. The system of claim 2, comprising a third steam generator disposed along the gas path downstream from the second shift reactor, wherein the third steam generator is configured to transfer heat away from the gas path to generate a third steam.

4. The system of claim 3, wherein the third steam generator is disposed along the gas path downstream from the second steam generator.

5. The system of claim 3, comprising a fourth steam generator disposed along the gas path downstream from the second shift reactor, wherein the fourth steam generator is configured to transfer heat away from the gas path to generate a fourth steam.

6. The system of claim 5, wherein the third steam generator is disposed along the gas path downstream from the second steam generator, and the fourth steam generator is disposed along the gas path downstream from the third steam generator.

7. The system of claim 1, wherein the AGR system comprises a first AGR section disposed along the gas path upstream from the first shift reactor and a second AGR section disposed along the gas path downstream from the second shift reactor, the first AGR section is configured to remove hydrogen sulfide ($H_2S$), and the second AGR section is configured to remove carbon dioxide ($CO_2$).

8. The system of claim 7, comprising a second steam generator disposed along the gas path downstream from the second shift reactor and upstream from the second AGR section, wherein the second steam generator is configured to transfer heat away from the gas path to generate a second steam.

9. The system of claim 1, comprising a saturator disposed along the gas path upstream from the first shift reactor, wherein the saturator is configured to saturate a gas along the gas path with at least the first steam.

10. The system of claim 9, comprising a second steam generator disposed along the gas path downstream from the second shift reactor, wherein the second steam generator is configured to transfer heat away from the gas path to generate a second steam, and the saturator is configured to saturate the gas along the gas path with at least the first steam and the second steam.

11. The system of claim 1, comprising an ammonia stripper configured to receive the first steam from the first steam generator, a second steam from a second steam generator disposed along the gas path downstream from the second shift reactor, or a combination thereof.

12. A system, comprising:
    a gas processing section, comprising:
    a gas path;
    a first shift reactor disposed along the gas path;
    an acid gas removal (AGR) system disposed along the gas path,
    a first steam generator disposed along the gas path, wherein the first steam generator is configured to transfer heat away from the gas path to generate a first steam; and
    an ammonia stripper configured to receive the first steam and a condensate from the gas path, wherein the ammonia stripper is configured to strip ammonia from the condensate using the first steam.

13. The system of claim 12, wherein the first steam generator is disposed downstream from the first shift reactor.

14. The system of claim 13, comprising a second shift reactor disposed along the gas path downstream from the first shift reactor, and the first steam generator is disposed downstream from the first and second shift reactors.

15. The system of claim 12, comprising a first gas cooling section disposed along the gas path upstream from the first shift reactor and a second gas cooling section disposed along the gas path downstream from the first shift reactor, wherein the ammonia stripper is configured to receive the condensate from the first and second gas cooling sections.

16. A system, comprising:
    a gas processing section, comprising:
    a gas path;
    a first shift reactor disposed along the gas path;
    a first gas cooling section disposed along the gas path upstream from the first shift reactor;
    a second gas cooling section disposed along the gas path downstream from the first shift reactor;
    a first steam generator disposed along the gas path in the first gas cooling section or the second gas cooling section, wherein the first steam generator is configured to transfer heat away from the gas path to generate a first steam, and the first steam generator is configured to supply the first steam to an ammonia stripper or a saturator in the gas processing section.

17. The system of claim 16, wherein the first steam generator is disposed in the second gas cooling section.

18. The system of claim 16, comprising a second shift reactor disposed along the gas path downstream from the first shift reactor, and a second steam generator disposed along the gas path between the first and second shift reactors, wherein the second steam generator is configured to transfer heat away from the gas path to generate a second steam, and the second steam generator is configured to supply the second steam to the ammonia stripper or the saturator in the gas processing section.

* * * * *